(12) United States Patent
Goedhart (10) Patent No.: US 10,785,116 B1
(45) Date of Patent: Sep. 22, 2020

(54) COMPUTER ARCHITECTURE FOR ASSET MANAGEMENT AND DELIVERY

(71) Applicant: Electronic Arts Inc., Redwood City, CA (US)

(72) Inventor: Lennart Goedhart, Melbourne (AU)

(73) Assignee: Electronic Arts Inc., Redwood City, CA (US)

(*) Notice: Subject to any disclaimer, the term of this patent is extended or adjusted under 35 U.S.C. 154(b) by 286 days.

(21) Appl. No.: 15/405,186

(22) Filed: Jan. 12, 2017

(51) Int. Cl.
  *G06F 15/173* (2006.01)
  *H04L 12/24* (2006.01)
  *H04L 29/08* (2006.01)

(52) U.S. Cl.
  CPC ...... *H04L 41/0896* (2013.01); *H04L 41/5022* (2013.01); *H04L 67/06* (2013.01); *H04L 67/1097* (2013.01)

(58) Field of Classification Search
  CPC .............................. H04L 65/608; H04L 51/10
  See application file for complete search history.

(56) References Cited

U.S. PATENT DOCUMENTS

| | | | |
|---|---|---|---|
| 8,069,258 B1* | 11/2011 | Howell | H04L 67/38 463/42 |
| 9,325,806 B2* | 4/2016 | Bapst | H04L 67/42 |
| 9,510,044 B1* | 11/2016 | Pereira | H04N 21/44008 |
| 9,521,455 B1* | 12/2016 | Gupta | H04L 65/4084 |
| 9,934,227 B2* | 4/2018 | Schmidt | G06F 16/48 |
| 9,961,395 B2* | 5/2018 | Crabtree | H04N 21/23106 |
| 2005/0289381 A1* | 12/2005 | Yeo | G06F 11/1451 714/1 |
| 2006/0053181 A1* | 3/2006 | Anand | G06F 11/0715 |
| 2006/0149704 A1* | 7/2006 | Wyatt | G06F 16/40 |
| 2006/0242489 A1* | 10/2006 | Brockway | G06F 11/14 714/718 |
| 2008/0234047 A1* | 9/2008 | Nguyen | G07F 17/32 463/42 |
| 2010/0057886 A1* | 3/2010 | Dodge | H04L 65/4092 709/219 |
| 2011/0238789 A1* | 9/2011 | Luby | H04L 65/601 709/219 |
| 2011/0239078 A1* | 9/2011 | Luby | H04N 21/23432 714/752 |
| 2012/0004041 A1* | 1/2012 | Pereira | A63F 13/35 463/42 |
| 2013/0232229 A1* | 9/2013 | Firman | G06F 8/61 709/219 |

(Continued)

*Primary Examiner* — Umar Cheema
*Assistant Examiner* — Tesfu N Mekonen
(74) *Attorney, Agent, or Firm* — McDermott Will & Emery, LLP (57) ABSTRACT

Methods for reducing network bandwidth usage by managing data file assets in a bundle of data file assets requested for download are provided. In one aspect, a method includes receiving a manifest associated with a bundle including one or more assets. The manifest includes information regarding the one or more assets. The method includes comparing the information with locally stored assets. The method includes determining, based on the comparison, at least one asset to be requested. The method includes sending a request for the at least one asset. The method includes receiving, in response to the request, the at least one asset. Systems and machine-readable media are also provided.

18 Claims, 5 Drawing Sheets

(56) References Cited

U.S. PATENT DOCUMENTS

| | | | |
|---|---|---|---|
| 2013/0271655 A1* | 10/2013 | Krahnstoever | H04N 21/2187 348/500 |
| 2013/0311668 A1* | 11/2013 | Akhtar | H04L 65/60 709/231 |
| 2014/0074663 A1* | 3/2014 | Alsina | G06Q 30/0601 705/27.1 |
| 2014/0365831 A1* | 12/2014 | Resch | H04L 9/085 714/42 |
| 2015/0149589 A1* | 5/2015 | Hao | H04L 67/10 709/219 |
| 2015/0261600 A1* | 9/2015 | Iturralde | H04N 21/8456 714/747 |
| 2015/0271225 A1* | 9/2015 | Mao | H04L 47/27 709/219 |
| 2017/0091020 A1* | 3/2017 | Rat | H03M 13/2942 |
| 2017/0147603 A1* | 5/2017 | Bianchi | H04L 67/06 |
| 2018/0227648 A1* | 8/2018 | Zheng | H04N 21/845 |

* cited by examiner

COMPUTER ARCHITECTURE FOR ASSET MANAGEMENT AND DELIVERY

TECHNICAL FIELD

The present disclosure generally relates to a computer architecture for asset management and delivery, and more specifically relates to improving asset management for updating assets on a device. The present disclosure describes improved resource utilization and management to reduce network bandwidth.

BACKGROUND

Software applications can be updated over a network connection by downloading data used to modify the software applications. For example, a video game may use various data files ("assets"), which may be character models, item models, game levels, and other files needed for the video game. When these assets are updated, a device running the video game may connect to a server to request the updated assets. In some approaches, the device manages deltas, or changes in assets, for each issued update. The device downloads all assets and locally replaces old assets with the updated assets. Even if the downloaded assets are compressed, this approach may be inefficient, particularly when the device is on a mobile network for which bandwidth is limited, or when the device has storage space and/or memory constraints.

The description provided in the background section should not be assumed to be prior art merely because it is mentioned in or associated with the background section. The background section may include information that describes one or more aspects of the subject technology.

SUMMARY

The disclosed system provides for managing assets transmitted over a data communications network so that a device can efficiently and selectively retrieve the updated assets when needed. A server maintains the assets in a bundle, which is a complete set of the most recent version of the assets. A corresponding manifest lists information regarding the assets in the bundle. The device may use the manifest to determine which assets to request from the server.

According to certain aspects of the present disclosure, a computer-implemented method for reducing network bandwidth usage by managing data file assets in a bundle of data file assets requested for download is provided. The method includes receiving a manifest associated with a bundle comprising one or more assets. The manifest includes information regarding the one or more assets. The information includes a file path, a checksum, a bundle file size, and a client file size for each of the one or more assets. The method includes comparing the information with locally stored assets. The comparison includes determining assets listed in the manifest and not among the locally stored assets, determining assets listed in the manifest having client file sizes that differ from file sizes of corresponding locally stored assets, and determining assets listed in the manifest having checksums that differ from checksums of corresponding locally stored assets. The method includes determining, based on the comparison, at least one asset to be requested. The method includes sending a request for the at least one asset. The method includes receiving, in response to the request, the at least one asset.

According to certain aspects of the present disclosure, a system for reducing network bandwidth usage by managing data file assets in a bundle of data file assets requested for download is provided. The system includes a memory comprising locally stored assets. The system includes a processor configured to execute instructions which, when executed, cause the processor receive a manifest associated with a bundle comprising one or more assets. The manifest includes information regarding the one or more assets. The instructions cause the processor to compare the information with the locally stored assets. The instructions cause the processor to determine, based on the comparison, at least one asset to be requested. The instructions cause the processor to send a request for the at least one asset. The request includes a prioritized order of requested assets. The instructions cause the processor to receive through one or more download threads, in response to the request, the at least one asset.

According to certain aspects of the present disclosure, a non-transitory machine-readable storage medium comprising machine-readable instructions for causing a processor to execute a method for reducing network bandwidth usage by managing data file assets in a bundle of data file assets requested for download is provided. The method includes receiving a manifest associated with a bundle comprising one or more assets. The manifest includes information regarding the one or more assets. The method includes comparing the information with locally stored assets. The method includes determining, based on the comparison, at least one asset to be requested. The method includes sending a request for the at least one asset. The method includes receiving, in response to the request, the at least one asset.

According to certain aspects of the present disclosure, a system for reducing network bandwidth usage by managing data file assets in a bundle of data file assets requested for download is provided. The system includes means for receiving a manifest associated with a bundle comprising one or more assets, the manifest including information regarding the one or more assets. The system includes means for comparing the information with locally stored assets. The means for comparing is further configured for determining, based on the comparison, at least one asset to be requested. The means for comparing is further configured for sending a request for the at least one asset. The means for receiving the manifest is further configured for receiving, in response to the request, the at least one asset.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for reducing network bandwidth usage and simplifying asset management for a server and a device. For example, the device compares local assets against a manifest for a bundle of assets, and requests a subset of the assets from the bundle as listed in the manifest from the server. The server then sends the requested assets to the device.

The disclosed system provides an improvement to computer functionality by allowing computer performance of a function not previously performed by a computer. Specifically, the disclosed system provides for a server to maintain, for an application, a bundle of assets with a corresponding manifest. Rather than tracking deltas for updated assets with each new update to the application and/or assets, the server can maintain a single bundle of the latest version of the assets, with the corresponding manifest detailing the current set of assets. A device retrieves the manifest, and compares the assets described in the manifest with the device's local assets. Any asset described in the manifest that does not match the local assets are requested from the server. Rather than sending a predefined set of updates or a patch which may include more assets than needed by the device, the server may send only the requested assets, which may be compressed and sent in multiple download threads.

The disclosed system addresses a technical problem tied to computer technology and arising in the realm of computer networks, namely the technical problem of reducing network bandwidth usage. The disclosed system solves this technical problem by having the server maintain the bundle and manifest of the latest set of assets. After comparing the manifest against the device's local assets, the device may request only the assets that do not match against the local assets. The server may send a customized subset of assets based on the request such that the server does not send more assets than what the device needs. Network bandwidth may further be reduced, for example through compression, multiple download threads, and prioritizing assets for downloading.

The disclosed system addresses a technical problem tied to computer technology, namely the technical problem of limited storage space and/or processing resources on requesting devices. The disclosed system solves this technical problem by having the device use the manifest to determine which local assets are to be updated. Comparing the local assets against the manifest may require less processing resources than other methods of determining which assets require updates, for example comparing sets of change logs. The device requests only a subset of the assets such that the device does not download more than the assets the device requires. Thus, the device does not use unnecessary storage space and/or processing resources to obtain the most recent versions of assets it may already have.

While many examples are provided herein in the context of a video game, the principles of the present disclosure contemplate other types of software as well. For example, productivity software, utility software, and other types of software in which one or more related assets or files may be updated are all considered within the scope of the present disclosure.

Example System Architecture

Figure 1:
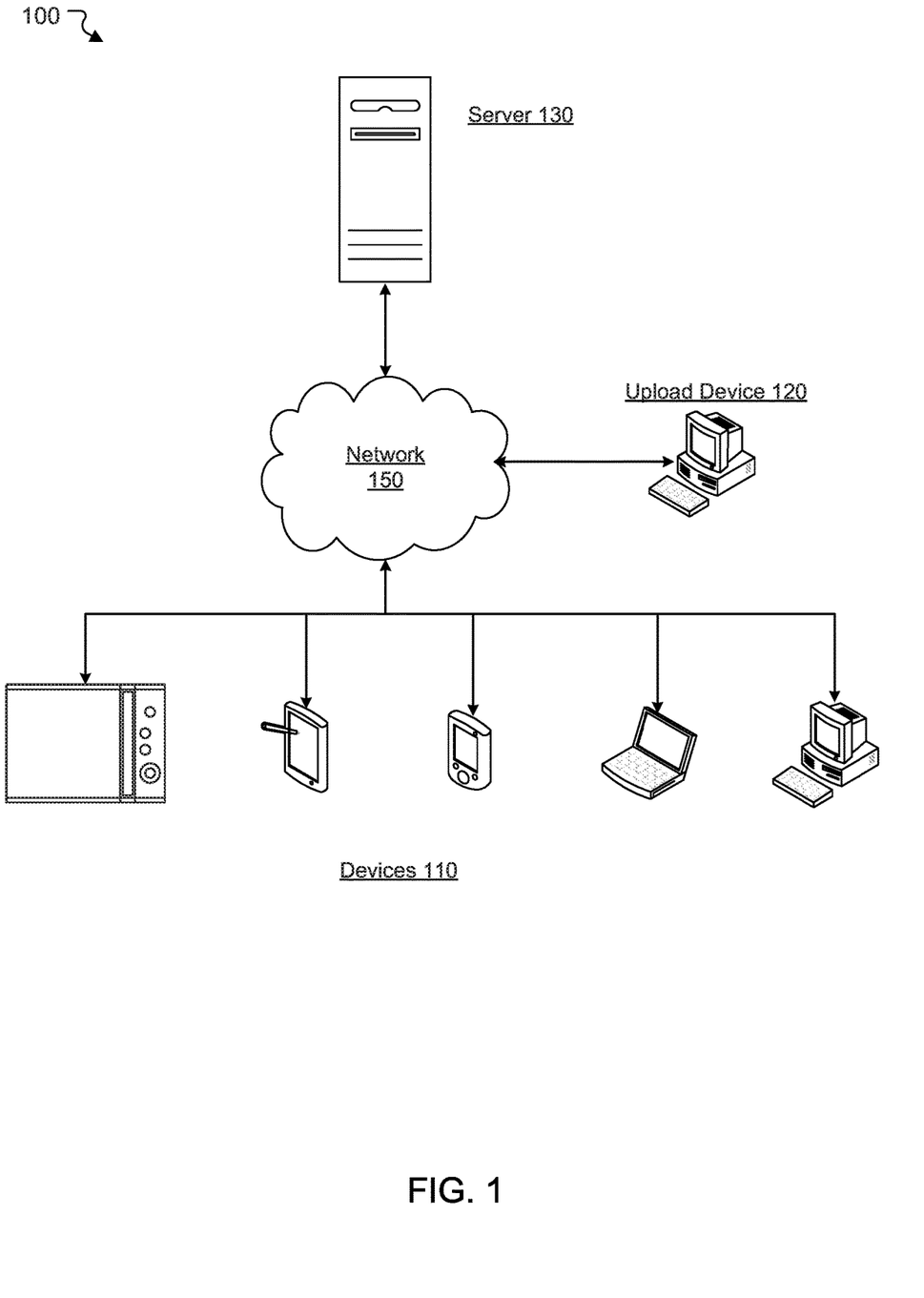
FIG. 1 illustrates an example architecture for asset management and delivery.

FIG. 1 illustrates an example architecture 100 for reducing network bandwidth usage by managing assets to be downloaded. The architecture 100 includes one or more servers 130, upload device 120, and devices 110 connected over a network 150.

One of the many servers 130 is configured to host a bundle of assets, for an application, with a corresponding manifest. For purposes of load balancing, multiple servers 130 can host the bundle and the manifest. The upload device 120 is configured to create and send the bundle and the manifest to the server 130. The server 130 is configured to send one or more assets to the devices 110 in response to requests from the devices 110.

The bundle is a complete set of the most recent versions of the assets. The bundle may be stored as a single file, which may contain compressed elements, to reduce overhead of managing multiple files and to reduce storage space requirements on the server 130. The manifest includes a list of the assets in the bundle, which may identify the assets by filename and/or path, or other identifier. The manifest may include additional information about the assets. For example, if the assets are stored as a single file in the bundle, the manifest provides offset information for each asset, such that a specific asset may be located in the bundle. The manifest may further include checksum information for each asset, which may be used for verifying an asset. The manifest may also include information specifying whether each asset is optionally compressed.

The servers 130 can be any device having an appropriate processor, memory, and communications capability for hosting assets and manifests. The devices 110 and upload device 120 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Managing Assets

Figure 2:
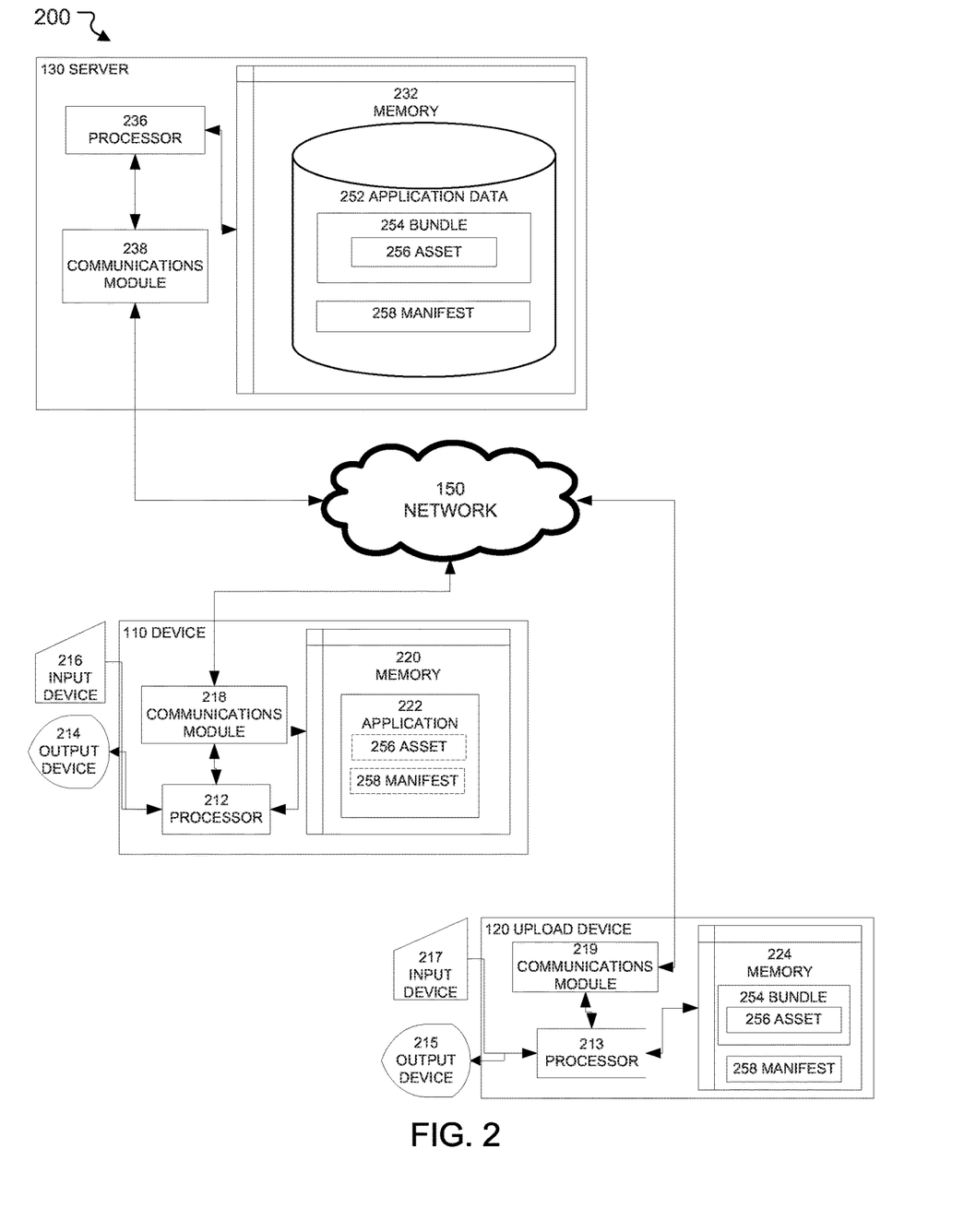
FIG. 2 is a block diagram illustrating the example device and server from the architecture of FIG. 1 according to certain aspects of the disclosure.

FIG. 2 is a block diagram 200 illustrating an example server 130, upload device 120, and device 110 in the architecture 100 of FIG. 1 according to certain aspects of the disclosure.

The device 110, the upload device 120, and the server 130 are connected over the network 150 via respective communications modules 218, 219, and 238. The communications modules 218, 219, and 238 are configured to interface with the network 150 to send and receive information, such as data, requests, responses, and commands to other devices on the network. The communications modules 218, 219, and 238 can be, for example, modems or Ethernet cards.

The server 130 includes a processor 236, a communications module 238, and a memory 232 that includes a bundle 254, which contains one or more assets 256, and a manifest 258. The application data 252 corresponds to data for an application, which may be a video game, a simulator, an app, a utility application, a productivity application, or other type of application which uses assets. The bundle 254 corresponds to the most current set of the assets 256 of the application. The assets 256 may be compressed, or may be of a compressed file format, such as .mp3, .mp4, .jpeg, etc. The manifest 258 describes the bundle 254. For example, the manifest 258 may contain a listing of all assets 256 in the bundle 254, in an order corresponding to an order of the assets 256 as stored in the memory 232. The manifest 258 may include a file path for each asset 256. The manifest 258 may further include information about the assets 256, including a bundle file size, a client file size and a checksum for each asset 256. The bundle file size corresponds to a file size of the asset as stored in the bundle 245. The client file size corresponds to a file size of the asset as stored on a client device. A difference in the bundle file size and the client file size indicates that the asset is compressed. The manifest 258 may also include an offset for each asset, corresponding to a location of the asset in the bundle 245. The manifest 258 may further include a timestamp, such as a timestamp corresponding to a creation or modification date of the bundle 254 or each asset 256.

The server 130 may store the most recent version of the bundle 254, rather than storing multiple deltas for each asset 256. In other words, the creation and/or modification dates for each asset 256 may vary in the bundle 254. When one or more assets 256 are updated, the entire bundle 254 may be replaced with an updated version of the bundle 254 containing the updated versions of the assets 256. The manifest 258 is also updated to reflect the updated assets. In this way, the server 130 may not need to manage each individual asset 256 and track updates. As noted, the bundle 254 includes the most updated set of assets 256, which simplifies the management of the assets 256 for the server 130. In other words, the bundle 254 is a complete set of the most updated set of the assets 256. In certain implementations, the server 130 may store older versions of the bundle 254. Alternatively, the server 130 may store the updated version of the bundle 254 at a different location rather than replacing a previous version of the bundle 254, and reference only the updated version of the bundle 254.

The processor 236 of the server 130 is configured to execute instructions, such as instructions physically coded into the processor 236, instructions received from software in memory 240, or a combination of both. For example, the processor 236 of the server 130 executes instructions to receive a request from a device 110 for one or more assets 256 of the bundle 254, identify one or more chunks which include the requested assets, and send the one or more chunks to the device through one or more download threads.

The upload device 120 includes a processor 213, a communications module 219, and the memory 221, the bundle 254 that includes the assets 256, and the manifest 258. The upload device 120 also includes an input device 217, such as a keyboard, mouse, touchscreen and/or game controller, and an output device 215, such as a display. The processor 213 of the upload device 120 is configured to execute instructions, such as instructions physically coded into the processor 213, instructions received from software in the memory 224, or a combination of both. For example, the processor 213 executes instructions to build the bundle 254 and the corresponding manifest 258 for uploading to the server 130.

The device 110 may make one or more requests to the server 130 for one or more of (i) assets listed in the manifest and not on the device 110, (ii) assets listed in the manifest having a different file size than corresponding assets on the device 110, and (iii) assets listed in the manifest having a different checksum than corresponding assets on the device 110.

The manifest 258 may include an offset for each asset in the bundle and an order of assets in the bundle, such that the processor 236 identifies the requested one or more assets by applying the offsets in the order listed to find the asset 256 in the bundle 254. For example, if a first asset is 17 kb, then the location of the second asset is 17 kb offset from the start of the bundle 254. In this case, the manifest 258 would indicate that the first asset is 17 kb.

The processor 212 may optimize the network request to the server 130 in chunks to include one or more adjacent assets 256, which may be compressed, to retrieve to the device 110. A chunk may be a fragment of information which may be used, for example, in various multimedia formats and in message transmission, such as hypertext transfer protocol (HTTP). The use of chunks may improve efficiency of network bandwidth usage. For example, rather than sending multiple assets as discreet files, which requires additional overhead to establish communication for each file being sent, the processor 212 may request one chunk containing multiple assets. The chunk may be further optimized based on file size. A chunk size of up to a threshold chunk file size, such as 1 MB, may improve network bandwidth efficiency. For example, retrieving files in chunks based on the threshold chunk file size may reduce the overhead in making multiple connections to send a larger amount of smaller files, while balancing the bandwidth requirement of sending large files. The processor 212 may organize the request for assets into a specific order based on file size in order to satisfy the threshold chunk file size required for the processor 212. To further improve efficiency of network bandwidth usage, multiple chunks may be requested through one or more parallel download threads for the device 110.

The device 110 may request assets in chunks in a prioritized order. The processor 212 may organize the chunks in the request based on priority of assets, such that a highest priority chunk, which may include a highest priority asset, is retrieved first.

The device 110 includes a processor 212, the communications module 218, and the memory 220 that includes the application 222, including the assets 256 and the manifest 258. The application 222 may be a video game, simulator, app, utility application, productivity application, or any other software application which utilizes assets. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in memory 220, or a combination of both. The processor 212 of the device 110 executes instructions from the application 222 causing the processor 212 to retrieve the manifest 258, and compare assets stored locally on the device 110 (e.g. in the memory 220) with the assets 256 stored on the server 130 (which is reflected in the manifest 258) to determine which assets to request from the server 130.

More specifically, the processor 212 may determine assets listed in the manifest 258 that are not stored locally on the device 110 in the memory 220. The processor 212 may request the manifest 258 from the server 130. Alternatively, the server 130 may send the manifest 258 to the device 110 in response to updating the bundle 254. The processor 212 may determine which assets listed in the manifest 258 are not also stored in the memory 220, and flags the missing assets. The processor 212 may determine assets that are listed in the manifest 258 having file sizes different than file sizes of corresponding assets on the device 110. The processor 212 compares the file sizes of the assets on the device 110 with the file sizes described in the manifest 258. The processor 212 flags any assets that do not match file sizes, as the different file size indicates that the asset was updated. The processor 212 may also determine assets which are listed in the manifest 258 having different checksums than the checksums of corresponding assets on the device 110. The processor 212 compares checksums for the assets on the device 110 with the checksums described in the manifest 258. If any of the compared checksums do not match, the processor 212 flags the assets, as the mismatched checksum indicates that the asset is different. The unflagged assets are considered up-to-date. The processor 212 sends a request to the server 130 for the flagged assets. In certain implementations, the processor 212 may send a request for a subset of the flagged assets, rather than all assets.

The processor 212 may further determine a priority for the assets. The priority may be determined based on, for example, a predicted need for the asset. For example, the application 222 may be a game utilizing a first asset for a first level of the game, and a second asset for a second asset of the game. Because the first asset would be needed before the second asset (as the first level would be played before the second level), the first asset would have priority over the second asset. Priority may also be determined based on other factors. For example, if an asset is required to play the game the required asset may be prioritized. If an asset corresponds to an in-game purchase by the user, the purchased asset may be prioritized. The request may reflect the priority, for example an order of requested assets, an index, or other indication of priority. In certain implementations, the processor 212 may request just the prioritized assets.

When the device 110 receives the requested assets, the device 110 may receive compressed assets, through one or more chunks via one or more parallel download threads. The processor 212 may decompress the compressed assets as the compressed assets are received.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
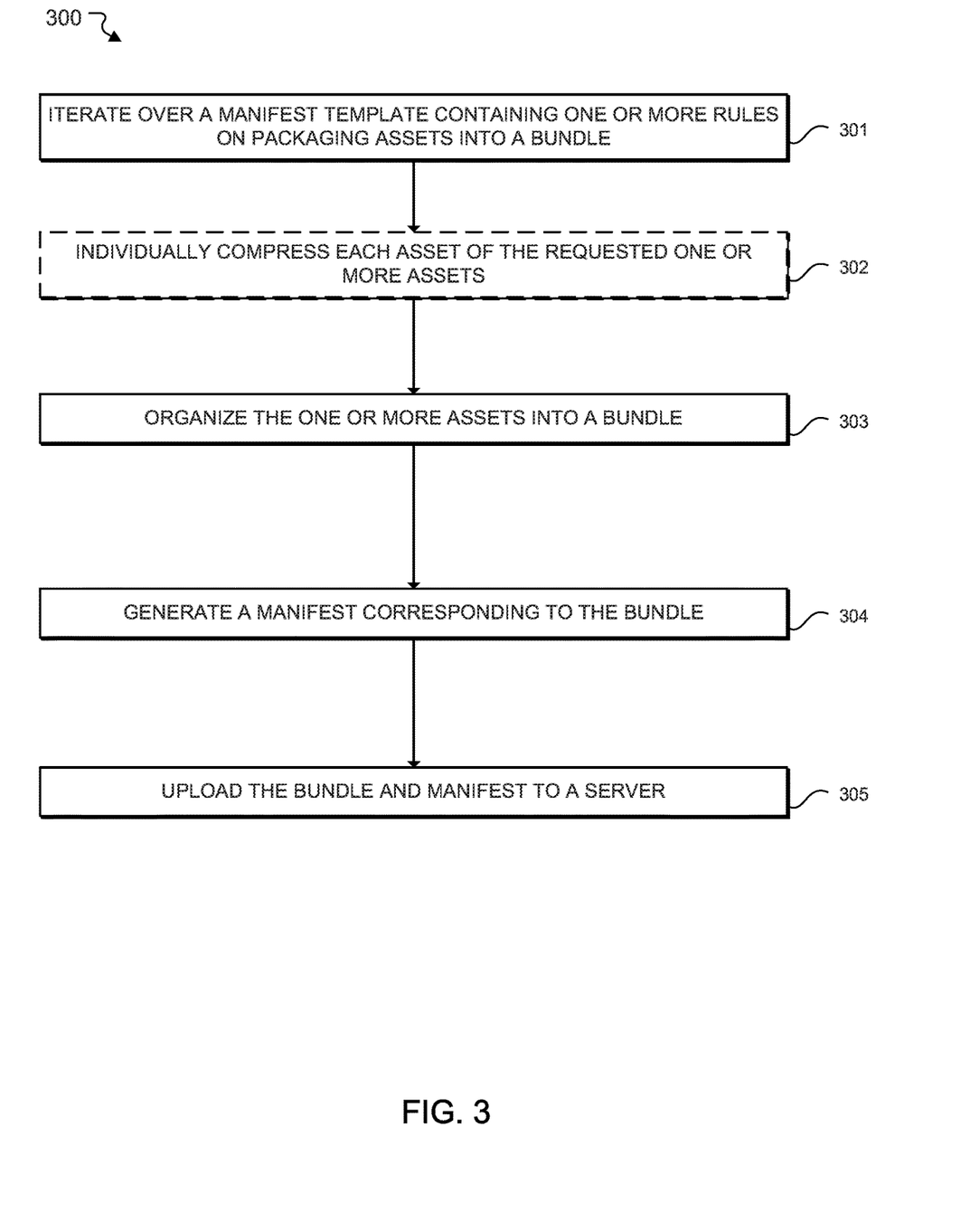
FIG. 3 illustrates an example process for reducing network bandwidth usage by creating assets to be uploaded to the example server of FIG. 2.

FIG. 3 illustrates an example process 300 for reducing network bandwidth usage by creating bundles, with the upload device 120, to be uploaded to the example server 130 of FIG. 2. While FIG. 3 is described with reference to FIG. 2, it should be noted that the process steps of FIG. 3 may be performed by other systems.

The process 300 begins by proceeding to step 301, wherein the processor 213 of the upload device 120 iterates over a manifest template containing one or more rules on packaging the assets 256 into the bundle 254. For example, the rules may specify organizing the assets 256 by date created and/or modified, by filename and/or path, by predicted order of use by a user (e.g. organized by game levels), or by optimized storage on the server 130. The rules may also specify whether the assets 256 should be optionally compressed.

At step 302, which may be optional based on the rules, each requested asset may be compressed. Compressing the assets reduces their file sizes, in order to reduce network bandwidth usage. In certain implementations, the requested assets 256 may not be compressed. For example, the assets may already be compressed in the bundle 254. Alternatively, the assets may be of a compressed file format. The manifest 258 may indicate whether the assets 256 are compressed. For instance, a mismatch between the bundle file size and the client file size for an asset 256 indicates that the asset 256 is compressed, and will have to be decompressed. Assets 256 may be compressed for storing in the bundle 254 based on factors such as whether the asset is already in a compressed file format, whether compression will save disk space, whether decompression will require significant overhead or resources, etc.

At step 303, the processor 213 organizes the assets into an ordered bundle of assets. The bundle 254 may be a single file containing the assets 256 written to the bundle 254 based on the rules. In other words, the bundle 254 may be a container for the assets 256. The processor 213 may further organize the assets based on the priority required by the application 222, such that the highest priority asset chunks will be requested first. In certain implementations, the assets may not be compressed before writing the assets to the bundle. In certain implementations, the assets may be compressed before writing the assets to the bundle.

At step 304, the processor 213 generates a manifest corresponding to the bundle 254.

At step 305, the upload device 120 uploads the bundle 254 and manifest 258 to the server 130. The server 130 may replace a previous version of the bundle and manifest with the uploaded version, or may store the uploaded version separately. The server 130 may treat the bundle as a single file stored on the server 130. In other words, the server 130 may not be aware of the bundle containing various assets. The server 130 serves the updated bundle or portions thereof in response to requests from client devices such as the device 110.

Figure 4:
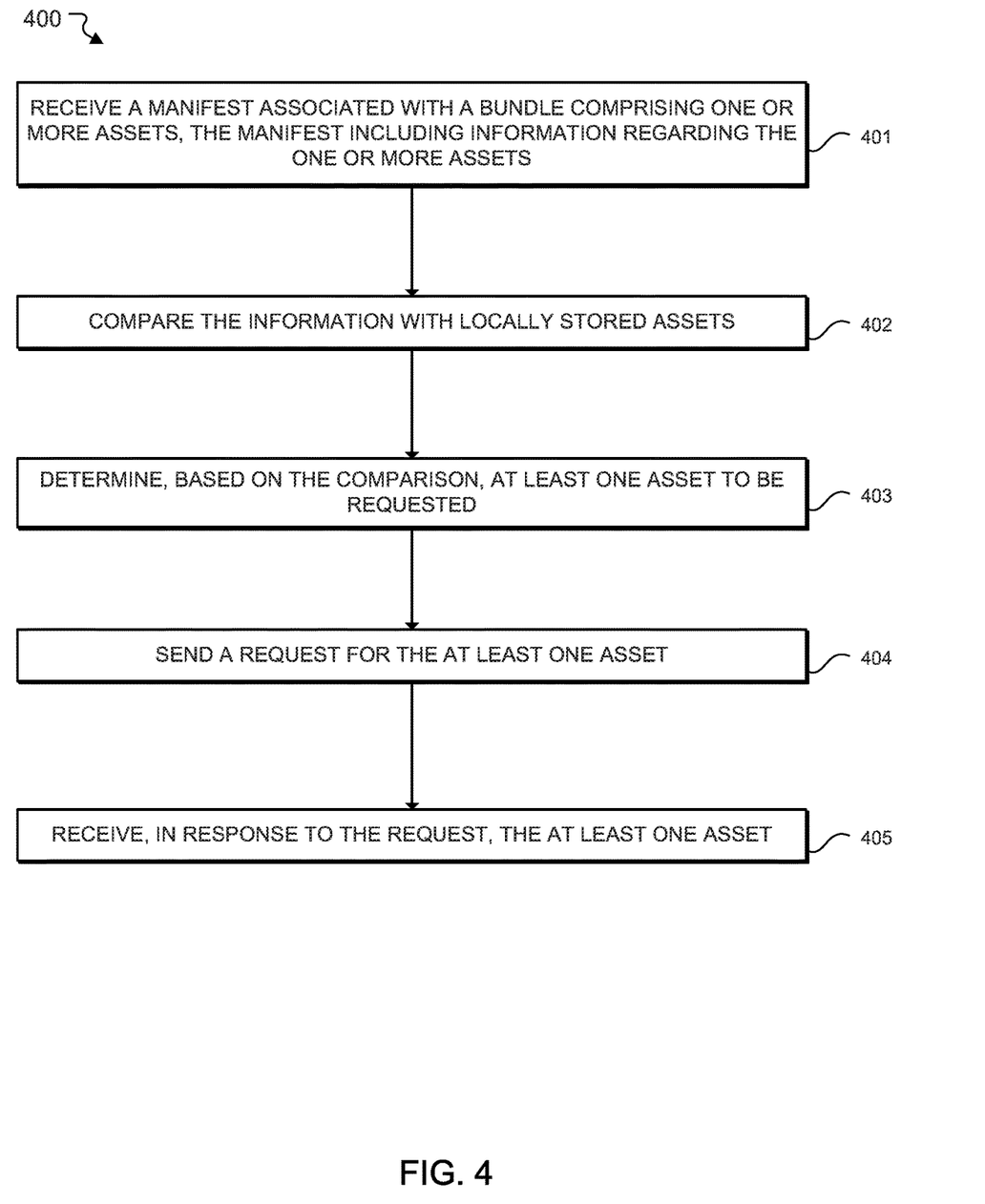
FIG. 4 illustrates an example process for reducing network bandwidth usage by requesting assets to be downloaded using the example device and server of FIG. 2.

FIG. 4 illustrates an example process 400 for reducing network bandwidth usage by managing assets to be downloaded using the example device 110 of FIG. 2. While FIG. 4 is described with reference to FIG. 2, it should be noted that the process steps of FIG. 4 may be performed by other systems.

The process 400 begins by proceeding to step 401, wherein the device 110 receives the manifest 258 from, for example, the server 130. The device 110 may have been running the application 222, which may have determined a need for requesting assets. For example, the application 222 may notice that the user will soon require assets for a feature, such as a video game level or a functionality of a utility application, which the user is likely to access. Alternatively, the user may have purchased, unlocked, or otherwise obtain access rights to additional assets. In yet other alternatives, the application 222 may periodically check to see if any assets need to be updated. The device 110 may prioritize assets, for example assets that the user will soon require. The device 110 may prioritize assets in order to minimize a downtime for a user waiting for the assets, for example to minimize a downtime for a user from gameplay waiting for the next level.

At step 402, the device 110 compares information in the manifest 258 with locally stored assets in the memory 220 of the device 110. The device 110 may compare the assets listed in the manifest 258 with the locally stored assets and flags assets that are not locally stored. The device 110 may compare client file sizes of the assets, as described in the manifest 258, with file sizes of the corresponding locally stored assets, and flag assets that do not match file sized. For the assets having matching file sizes, the device 110 may compare checksums of the assets, as described in the manifest 258, with checksums of the corresponding locally stored assets, and flag assets that do not match checksums. In certain implementations, the device 110 may check only the prioritized assets.

At step 403, the device 110 determines, based on the comparison at step 402, at least one asset to be requested. For example, the device 110 may determine that all assets flagged at step 402 should be requested. Alternatively, the device 110 may determine that a subset of the flagged assets, such as prioritized assets, should be requested.

At step 404, the device 110 sends to the server 130 a request for the at least one asset. The request may include an identifier for the requested assets, such as file name or path. The identifier may be an offset, or range of offsets. For example, the device 110 may determine, based on the bundle file sizes of the assets as described in the manifest 258, offset ranges corresponding to locations of the assets within the bundle 254. The request may further include a prioritization of the requested assets. The device 110 may further organize the requested assets into chunks. The chunks may be organized based on a threshold chunk file size, which may be optimized for bandwidth available to the device 110. The chunks may be determined by assets that are adjacent to each other in the bundle 254 forming a chunk, up to the threshold chunk file size. Assets that are not adjacent may be requested in a separate chunk request. Thus, the chunks may be defined by one or more ranges of offsets. The request may also include an indication as to how many parallel download threads the device 110 may receive. The download threads may correspond to a number of requested chunks. For example, the request may indicate multiple chunks in parallel. A number of concurrent parallel threads may be limited to a threshold thread amount. In addition, the request may also include an indication as to whether the device 110 may decompress assets as they are downloaded.

At step 405, the device 110 receives, in response to the request, the at least one asset. The server 130 may receive the request and send the requested assets, for example by sending the data corresponding to the offset ranges in the request. The server 130 may send the requested assets in one or more chunks, which may be based on the threshold chunk file size in the request. The server 130 may send the requested assets through one or more download threads, which may be based on the request. The device 110 may decompress the received assets as the device 110 downloads the assets. Alternatively, the device 110 may receive the assets and decompress them as needed, for example based on the bundle file sizes and client file sizes in the manifest 258.

For example, the application 222 running on the device 110 may be a video game app. The developers of the video game may iterate, using the upload device 120, over a manifest template of rules for packaging assets into a bundle (301). The assets are compressed (302) and written into a bundle (303). The upload device 120 generates a corresponding manifest (304) and uploads the bundle and manifest to the server 130 (305). When a user of the app is nearing completion of a first level of the app, for example by reaching a checkpoint in the first level, the app may determine that assets for the second level may be needed. The app may request the manifest 258 from the server 130. After receiving the manifest 258 (401), the device 110 may use the manifest 258 to compare the information in the manifest 258 with locally stored assets (402) to determine which assets to request from the server 130 (403). As stated above, the device 110 may determine which assets listed in the manifest 258 are not stored locally, either as missing or having a mismatching file size or checksum. The device 110 may further prioritize assets that may be soon required, for example the assets for the second level. The device 110 may identify assets, for example by file name and/or path, or other information describing the assets. The device 110 may then request at least the prioritized assets from the server 130 (404). The server 130 receives the request and identifies the requested assets in the bundle. The server 130 sends the requested assets as chunks to the device 110 through one or more download threads. The device 110 receives the chunks and stores the assets in the memory 220 (405).

In certain implementations, a bundle may include a plurality of manifests corresponding to a plurality of manifests to be delivered to a device. Thus, a device may request, similar to requesting an asset, a specific manifest from the bundle of manifests.

Hardware Overview

Figure 5:
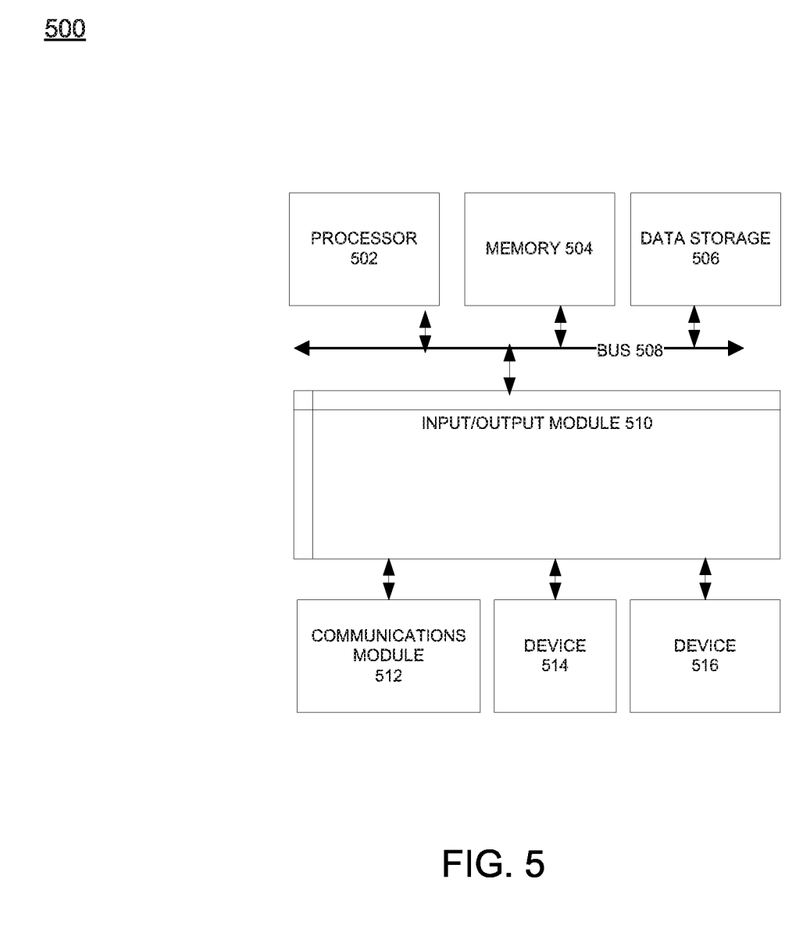
FIG. 5 is a block diagram illustrating an example computer system with which the devices and server of FIG. 2 can be implemented.

FIG. 5 is a block diagram illustrating an example computer system 500 with which the device 110 and server 130 of FIGS. 1 and 2 can be implemented. In certain aspects, the computer system 500 may be implemented using hardware or a combination of software and hardware, either in a dedicated server, or integrated into another entity, or distributed across multiple entities.

Computer system 500 (e.g., device 110 and server 130) includes a bus 508 or other communication mechanism for communicating information, and a processor 502 (e.g., processor 212 and 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 or 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500 and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., devices 110). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications modules 238 or 218) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 408. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for reducing network bandwidth usage by managing data file assets in a bundle of data file assets requested for download, the method comprising:
   receiving a manifest associated with a bundle comprising one or more assets, the manifest including information regarding the one or more assets, the information comprising a file path, a checksum, a bundle file size, and a client file size, for each of the one or more assets;
   comparing the information with locally stored assets, wherein the comparison comprises:
      determining assets listed in the manifest and not among the locally stored assets;
      determining assets listed in the manifest having client file sizes that differ from file sizes of corresponding locally stored assets to indicate whether the assets are compressed; and
      determining assets listed in the manifest having checksums that differ from checksums of corresponding locally stored assets;
   determining, based on the comparison, at least one asset to be requested;
   determining a predicted need for the at least one asset, the predicted need based at least partially on whether the at least one asset is an in-game purchase comprising a virtual good;
   sending a request for the at least one asset, the request including a prioritized order of requested assets based on the predicted need for the at least one asset; and
   receiving, in response to the request, the at least one asset.

2. The computer-implemented method of claim 1, wherein the at least one asset is received in an order based on the prioritized order of requested assets.

3. The computer-implemented method of claim 1, wherein receiving the at least one asset comprises receiving the at least one asset through one or more download threads.

4. The computer-implemented method of claim 3, wherein receiving the at least one asset comprises receiving the at least one asset in one or more chunks through the one or more download threads, and wherein a chunk is a fragment of information.

5. A system for reducing network bandwidth usage by managing data file assets in a bundle of data file assets requested for download, the system comprising:
   a memory comprising locally stored assets; and
   a processor configured to execute instructions which, when executed, cause the processor to:
      receive a manifest associated with a bundle comprising one or more assets, the manifest including information regarding the one or more assets;
      compare the information with the locally stored assets to indicate whether the assets are compressed;
      determine, based on the comparison, at least one asset to be requested;
      determining a predicted need for the at least one asset, the predicted need based at least partially on whether the at least one asset is an in-game purchase comprising a virtual good;
      send a request for the at least one asset, wherein the request includes a prioritized order of requested assets based on the predicted need for the at least one asset; and
      receive through one or more download threads, in response to the request, the at least one asset.

6. The system of claim 5, wherein the information comprises a file path, a checksum, a bundle file size, and a client file size for each of the one or more assets.

7. The system of claim 5, wherein comparing the information with the locally stored assets comprises determining assets listed in the manifest and not among the locally stored assets, and wherein the at least one asset to be requested includes the determined assets.

8. The system of claim 5, wherein comparing the information with the locally stored assets comprises determining assets listed in the manifest having client file sizes that differ from file sizes of corresponding locally stored assets.

9. The system of claim 5, wherein comparing the information with the locally stored assets comprises determining assets listed in the manifest having checksums that differ from checksums of corresponding locally stored assets.

10. The system of claim 5, wherein the at least one asset is received through one or more chunks that are prioritized based on the prioritized order of requested assets, and wherein a chunk is a fragment of information.

11. A non-transitory machine-readable storage medium comprising machine-readable instructions for causing a processor to execute a method for reducing network bandwidth usage by managing data file assets in a bundle of data file assets requested for download, comprising:
   receiving a manifest associated with a bundle comprising one or more assets, the manifest including information regarding the one or more assets;
   comparing the information with locally stored assets to indicate whether the assets are compressed;
   determining, based on the comparison, at least one asset to be requested;
   determining a predicted need for the at least one asset, the predicted need based at least partially on whether the at least one asset is an in-game purchase comprising a virtual good;

sending a request for the at least one asset, the request including a prioritized order of requested assets based on the predicted need for the at least one asset; and receiving, in response to the request, the at least one asset.

12. The non-transitory machine-readable storage medium of claim 11, wherein the information comprises a file path, a checksum, a bundle file size, and a client file size for each of the one or more assets.

13. The non-transitory machine-readable storage medium of claim 11, wherein comparing the information with the locally stored assets comprises determining assets listed in the manifest and not among the locally stored assets, and wherein the at least one asset to be requested includes the determined assets.

14. The non-transitory machine-readable storage medium of claim 11, wherein comparing the information with the locally stored assets comprises determining assets listed in the manifest having client file sizes that differ from file sizes of corresponding locally stored assets.

15. The non-transitory machine-readable storage medium of claim 11, wherein comparing the information with the locally stored assets comprises determining assets listed in the manifest having checksums that differ from checksums of corresponding locally stored assets.

16. The non-transitory machine-readable storage medium of claim 11, wherein the at least one asset is received in an order based on the prioritized order of requested assets.

17. The non-transitory machine-readable storage medium of claim 11, wherein receiving the at least one asset comprises receiving the at least one asset through one or more download threads.

18. The non-transitory machine-readable storage medium of claim 17, wherein receiving the at least one asset comprises receiving the at least one asset in one or more chunks through the one or more download threads, and wherein a chunk is a fragment of information.

* * * * *